United States Patent [19]

Bostwick et al.

[11] 4,326,428

[45] Apr. 27, 1982

[54] TWO DEGREE OF FREEDOM RATE GYROSCOPE

[75] Inventors: Lewis S. Bostwick, Andover; Albert V. Filosa, Burlington; Richard R. LaTorre, Bedford, all of Mass.

[73] Assignee: Raytheon Company, Lexington, Mass.

[21] Appl. No.: 81,504

[22] Filed: Oct. 3, 1979

[51] Int. Cl.³ .............................................. G01C 19/22
[52] U.S. Cl. ..................................... 74/5 F; 64/15 B; 73/504
[58] Field of Search ................ 74/5 F; 64/15 B, 27 B, 64/27 L; 308/2 A; 73/505, 504

[56] References Cited

U.S. PATENT DOCUMENTS 3,529,477  9/1970  Quermann .............................. 74/5 F
4,030,371  6/1977  Bulman et al. ......................... 74/5 F
4,082,005  4/1978  Erdley ................................... 74/5 F X

*Primary Examiner*—Rodney H. Bonck
*Attorney, Agent, or Firm*—Richard M. Sharkansky; Joseph D. Pannone

[57] ABSTRACT

A rate gyroscope having a spinning mass coupled to a rotor through a pair of orthogonally disposed flexible, diametrically extending suspension arms. The spinning mass is adapted to pivot about the arms in response to a pair of orthogonal angular rates being measured by the gyroscope. The angular orientation of the mass with respect to the gyroscope housing provides an indication of the angular rates. An optical sensor system disposed within the gyroscope and supporting electronics are used to produce an electrical signal representative of the angular orientation of the mass and, hence, such signal provides a measurement of the pair of angular rates being measured by the gyroscope.

4 Claims, 18 Drawing Figures

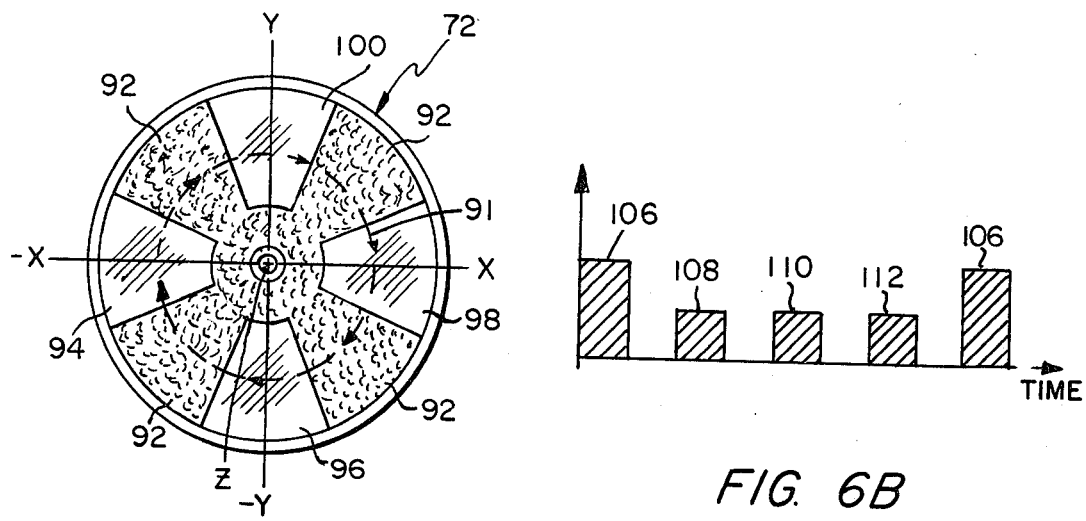
FIG. 6A
FIG. 6B
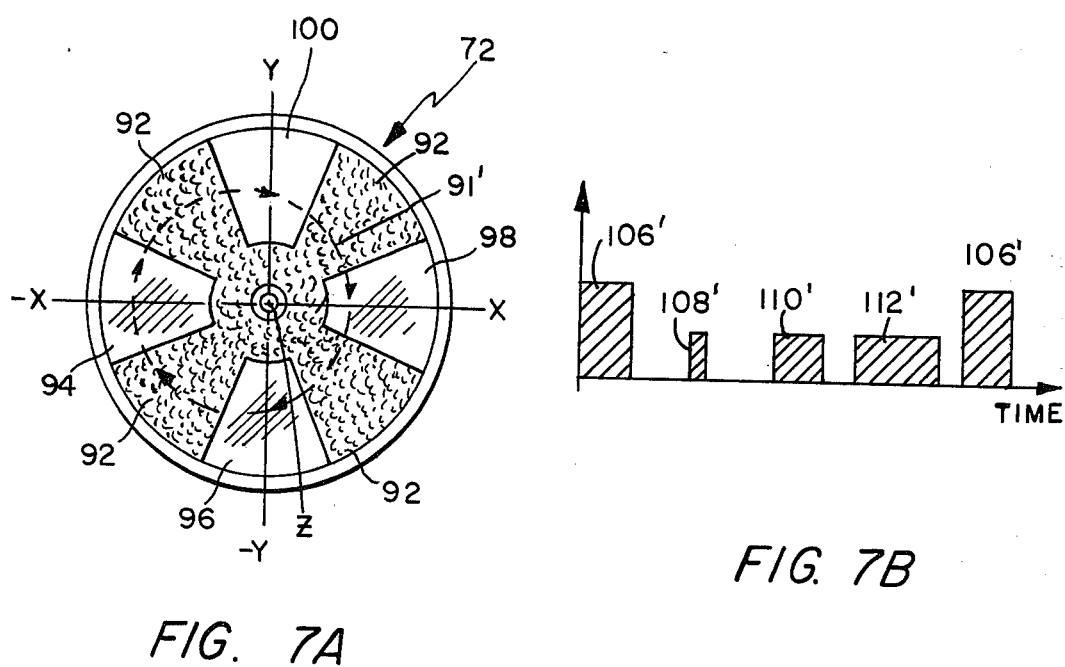
FIG. 7A
FIG. 7B

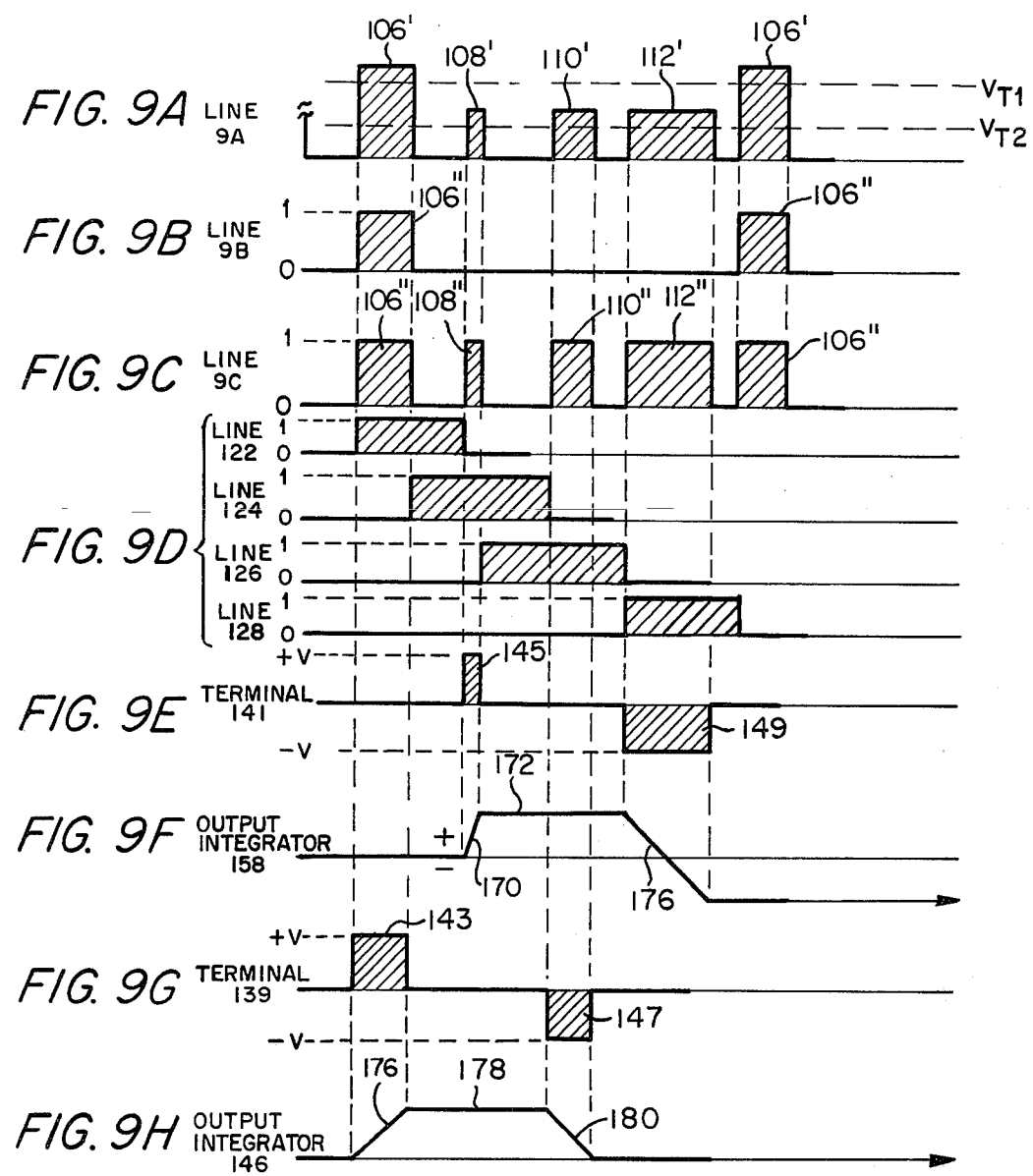

TWO DEGREE OF FREEDOM RATE GYROSCOPE

BACKGROUND OF THE INVENTION

This invention relates generally to rate gyroscopes and, more particularly, to two degree of freedom rate gyroscopes.

As is known in the art, rate gyroscopes have been used in a variety of applications, such as in homing missile systems for stabilization of a seeker tracking system and for stabilization of the missile through an autopilot.

One type of rate gyroscope is a single degree of freedom rate gyroscope. Here a mass is adapted to rotate about a spin axis of the gyroscope. In response to an angular rate about a single axis of the gyroscope, the mass pivots about an axis of a precession. The axis of precession, the input axis and the spin axis are mutually orthogonal. It follows then that since such gyroscope measures angular rates about the single axis two separate single degree of freedom rate gyroscopes would be required in measuring pitch and yaw angular rates.

A second type of rate gyroscope is a two degree of freedom rate gyroscope. One such gyroscope includes a drive shaft having a precisely machined, flexible end portion. The mass is coupled to the flexible end portion of a motor drive shaft. The mass is rotated by the motor and is adapted to pivot about two orthogonal axes of precession in response to angular rates about two orthogonal input axes. While such arrangement is useful in some applications, it is relatively difficult to accurately produce the flexible end portion of the drive shaft and provide a relatively inexpensive accurate two degree of freedom rate gyroscope.

SUMMARY OF THE INVENTION

In accordance with the presence invention, a two degree of freedom rate gyroscope is provided having a mass/or drum coupled to a rotor by a plurality of flexible suspension members extending diametrically between the drum and the rotor. One set of the flexible members is disposed orthogonally to a second set of such members. The drum is rotated by the rotor about a spin axis disposed coaxially with the fixed drive shaft. The drum is adapted to pivot about the first and second sets of flexible members in response to a pair of angular rates about a pair of orthogonal input axes.

In a preferred embodiment of the invention a disc is provided having a pair of inner and outer diameter sections, each one of such sections being coupled by the flexible suspension members. The drum is formed in two sections and the outer diameter section of the disc is sandwiched between the two sections of the drum. Likewise an end portion of the rotor has a pair of sections. The inner diameter section of the disc is sandwiched between the pair of sections of the end portion of the rotor.

BRIEF DESCRIPTION OF THE DRAWINGS

The above-mentioned and other features of the invention will become more apparent by reference to the following description taken together in conjunction with the accompanying drawings in which:

FIGS. 6A and 6B are diagrammatic representations of the reticle relationship to a beam of light projected thereon, and an electrical pulse train produced by a detector in response to such beam of light passing through the reticle when the pair of angular rates being measured by the gyroscope of FIG. 1 are zero;

FIGS. 7A and 7B are diagrammatic representations of the reticle relationship to a beam of light projected thereon, and an electrical pulse train produced by a detector in response to such beam of light passing through the reticle when the angular rate about one of the axes is other than zero;

FIGS. 9A–9H are timing diagrams useful in understanding the operation of signal processor shown in FIG. 8.

DESCRIPTION OF THE PREFERRED EMBODIMENT

Figure 1:
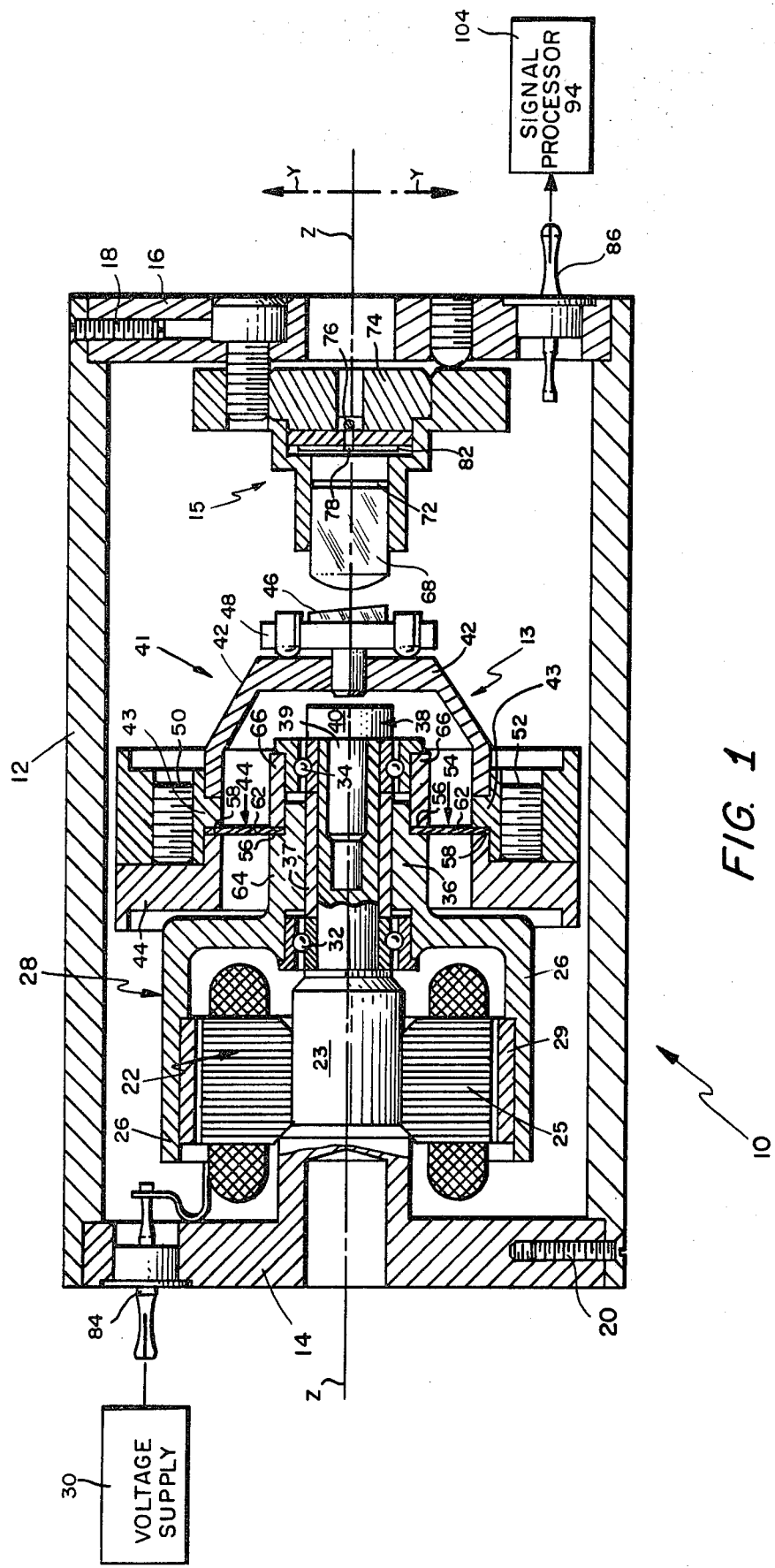
FIG. 1 is a detailed longitudinal cross-sectional view of a gyroscope according to the invention.
Figure 3:
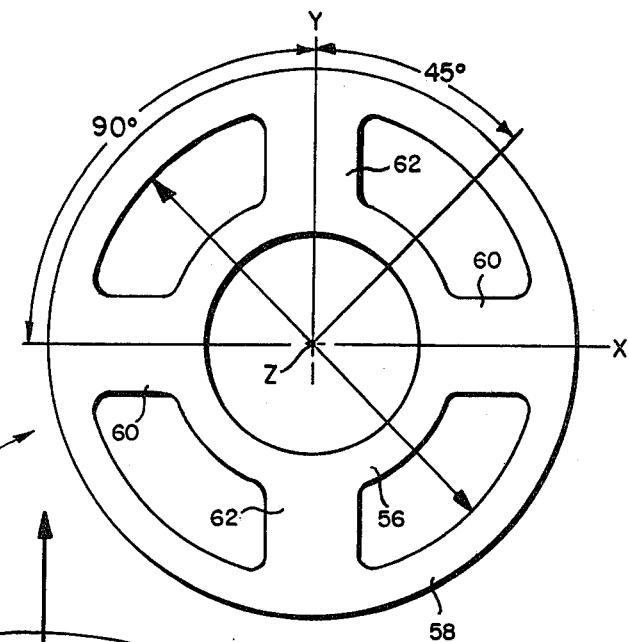
FIG. 3 is a plan view of a disc shown in FIG. 2.
Figure 2:
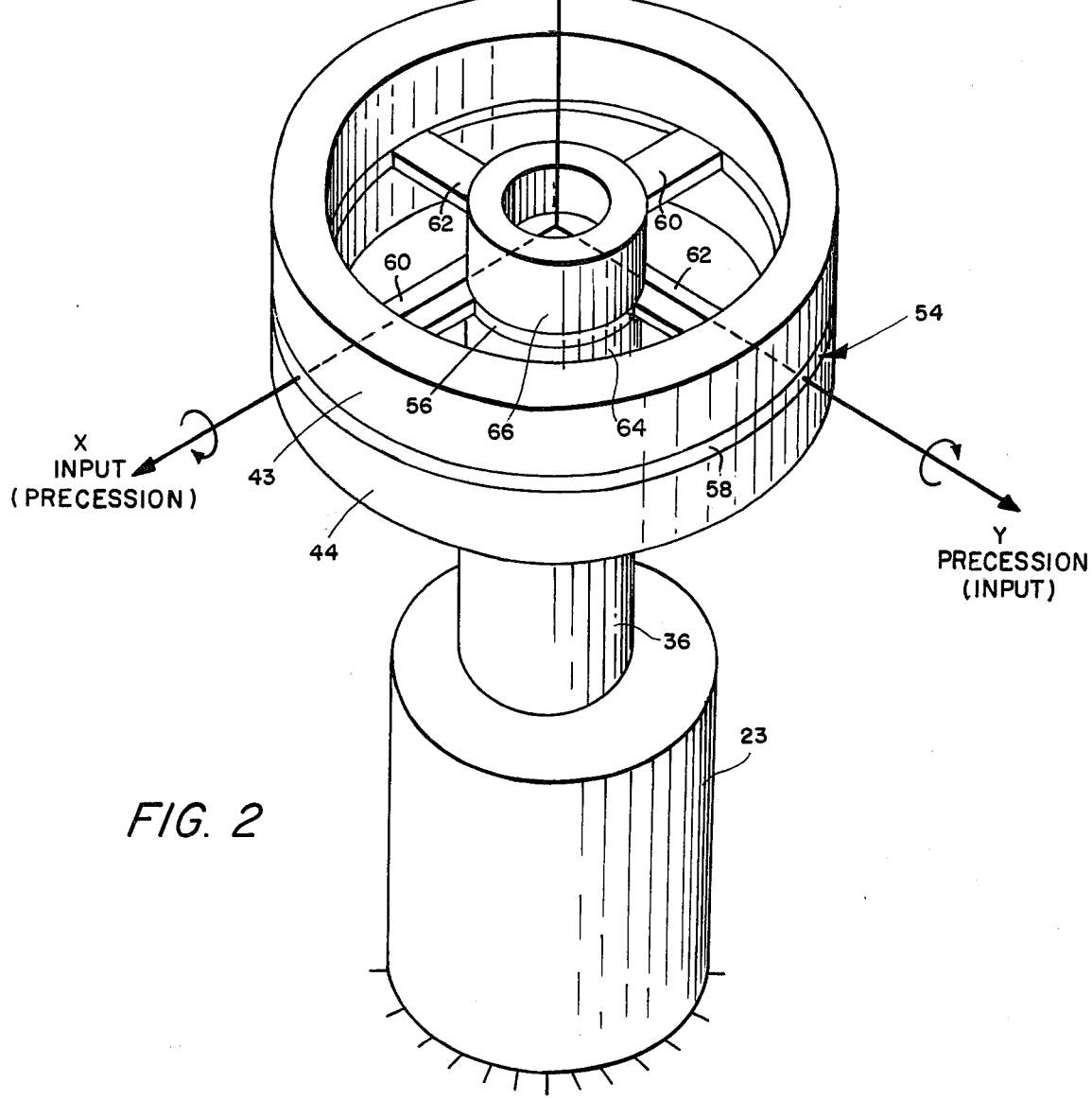
FIG. 2 is a diagrammatic representation of the rotating rotor and drum of the gyroscope in FIG. 1 interconnected by a disc having a pair of orthogonal, flexible, radially extending arm members useful in understanding the invention.

Referring now to FIGS. 1, 2 and 3 of the drawings wherein like reference numerals designate like parts throughout the several views, the illustration shown comprises a two degree of freedom rate gyroscope 10. Tubular housing 12 encloses both the rotatable components 13 and the fixed optical sensor system components 15 of gyroscope 10. Components 13 and 15 have been made removable by being attached to end plates 14 and 16, respectively, as shown, such end plates 14 and 16 being bolted to the ends of the housing by means of screw members 18 and 20. The rotatable components 13 include an electrical motor, here a conventional four-pole two-phase synchronous motor, having a stator 22 comprising a shaft 23 integrally formed with the end plate 14 and winding 25 disposed about shaft 23 in a conventional manner. The rotor 28 of said motor carries a conventional hysteresis ring 29 mounted in any conventional manner on a portion of umbrella 26 of the rotor 28. The rotor 28 is driven at a constant angular velocity about the longitudinal axis Z of the gyroscope housing 12, here at a rate of, 30,000 RPM, by the electrical motor. The rotor 28 is supported on the stator shaft 23 by a pair of bearings 32 and 34 located adjacent to an extension portion 36 of rotor 28, such extension section 36 having a reduced diameter from the umbrella 26 portion of the rotor 28 which surrounds stator 22. The bearings 32 and 34 are spaced from each other by a tubular shaped spacer member 37 affixed, here by press fit, to the extension portion 36 of shaft 23. A pin 38 is inserted along the longitudinal axis Z into a hollowed end portion of the extension portion of shaft 23. Such pin 38 has a shaft 39 affixed to the hollowed end portion of shaft 23, here, press-fit although such may be threaded into such shaft 23 with the inner walls of the hollowed portion being suitably tapped. The head 40 of the pin 38 retains the bearings 32 and 34 to the extension portion 36 of shaft 23.

Electrical connections to voltage supply 30 for the stator motor windings 25 and optical sensor system 15 output to processor 104 are made to utilizing soldered feed-throughs 84 and 86 located in the left-hand and right-hand end plates 14 and 16, intermediate connections not being shown.

A mass, here a rotating drum 41 is provided. Such drum 41 here has three sections; a cup-shaped end section 42, an intermediate balancing section 43 and a ring-shaped end section 44. The cup shaped end section 42 is provided with a mirror 46 having a planar reflective surface disposed at a fixed oblique tilt angle, illustratively 5.35 degrees with respect to a plane (not shown) disposed orthogonal to the gyroscope longitudinal axis Z. Such mirror 46 is attached to holder 48 by any conventional mounting technique. Screws 50-52 are circumferentially provided in the balancing section 43 of the rotating drum 41 as required to add weight for dynamic and static balancing of the rotating drum 41.

A flexible, disc-shaped suspension member 54, shown in detail in FIG. 3, interconnects the rotating drum 41 and rotor extension 36. Such disc flexible shaped member 54 is here made of stainless steel and is formed using any conventional stamping and forming process to have an inner section 56 and an outer diameter section 58 interconnected by a pair of diametrically extending flexible arms 60, 62, as shown. The inner diameter section 56 is disposed between two sections 64, 66 of the narrow diameter portion of the rotor. It is noted that section 66 is affixed to the outer race of bearing 34 (FIG. 1). Here the inner diameter section 56 and the sections 64, 66 are bonded together using a suitable bonding material and hence rotate about the Z axis with rotor 28. The bonding material used is, illustratively, Locquic Primer Grade T and Loctite High Temperature retaining compound (400°). In a similar manner cup-shaped end section 42 is bonded to the intermediate balancing section 43 and together with the outer section 58 of disc 54, is bonded to the ring shaped end section 44 and the balancing section 43, as shown. Hence the ring 54 mechanically couples the rotor 28 to the drum 41 to cause such drum 41 to rotate about the Z axis with rotor 28. The bonding material is applied to the parts and such are air dried to complete the bond. While rectangular cross-section arms 60, 62 of disc 54 have been illustrated in FIGS. 2 and 3, such arms 60, 62 may be of any shape, for example, circular or elliptical.

The following characteristics apply to the two degree of freedom rate gyro shown in FIG. 1;

| | | |
|---|---|---|
| Rotor Weight: | 21.02 grams | (.0463 lbs) |
| Spin Velocity | 3,140 rad/sec | (500 RPS) |
| Spin Moment of Inertia: | 17.58 gm cm$^2$ | (1.56 × 10$^{-5}$ lb in sec$^2$) |
| Transverse Moment of Inertia: | 9.88 gm cm$^2$ | (8.56 × 10$^{-6}$ lb in sec$^2$) |
| Moment Ratio: | 1.78 | |
| Nutation Frequency: | 5,589 rad/sec | (890 Hz) |
| Gyro Torque at input rate of 17.5 rad/sec: | 986 gm cm | (.858 lb. in.) |
| Spring Constant of Suspended Rotor in precessional mode | .010 inch thick .006 inch thick | 135.6 lb in/rad 29.3 lb in/rad |
| Natural Frequency of Suspended Rotor in precessional mode: | .010 inch thick .006 inch thick | 634 Hz. 295 Hz. |

As a result of the foregoing measurements and testing the following measurements were obtained:

Disc 54 thickness which will provide the desired elasticity results was between 0.006 inches and 0.010 inches. The static measurement of the resulting spring constant of the suspended rotor in the precessional mode was:

136 lb in/rad for 0.010 thick suspension member
29.0 lb in/rad for 0.006 thick suspension member.

A brief description of the operation of the rate gyroscope of the invention follows with reference to FIGS. 1, 2 and 3. The rate gyroscope 10 has two degrees of freedom which means that the spinning mass, here drum 41, can rotate around two quadrature axes, (X and Y) both of which are orthogonal to the longitudinal axis Z (the spin axis). The input axes orthogonal to the spin axis Z are designated as X and Y, here also sometimes referred to as the pitch and the yaw axes respectively.

In accordance with the invention, flexible, elastic suspension arms 60, 62 extend in a plane perpendicular to the spin axis Z, (ie. the X, Y plane) in the absence of angular rate about the X and Y axes. If an angular rate is applied around the X axis, the mass, or drum 41, precesses around the Y axis. Similarly, if an angular rate is applied around the Y axis, the mass, or drum 41, precesses around the X axis.

Precession of the mass, or drum 41, is restrained by bending forces and torsional forces exerted on the pair of elastic arms 60 and 62. For example consider an input angular rate about the X axis. This causes a torque which is developed about the Y axis. At a first instant time when the arms 60 are aligned with the X axis (as shown in FIG. 2) they experience torsional forces. At this same instant in time arms 62 are aligned with the Y axis and experienced bending forces. At a second instant in time, when the disc 44 rotates 90° from its position at the first instant in time, arms 60 are aligned with the Y axis and experienced bending forces while arms 62 are aligned with the X axis and experience torsional forces. In any event the precessional force is always about the Y axis when the input angular rate is applied about the X axis regardless of the position of the disc member 54. The net effect is that the plane of the disc 54 rotates to a fixed angle about the Y axis, such angle being proportional to the angular rate about the X axis. (As a result of the bending and torsional forces the design of the flexible suspension arms requires a compromise between stiffness in the precessional mode; stiffness along the spin axis; and stresses developed in the elastic arms as a result of the bending and torsional forces in the precessional mode.) Likewise, if an angular rate is applied around the input axis Y, the mass or drum 41 precesses about axis X. That is the arms 60, 62 experience alternating torsional and bending forces as they rotate about the Z axis, with the net effect that the plane of the disc 54 rotates to a fixed angle about the X axes which is proportional to the angular rate about the Y axis. A little thought will make it apparent then that, by principle of superposition, angular rates simultaneously applied about the X and Y axis will cause a rotation of the mass, or drum 41, about the Y and X axes, respectively with the result that the plane of the disc 54 will rotate to a fixed angle having two components, one angular component about the Y axes and one angular component about the X axes.

Figure 4:
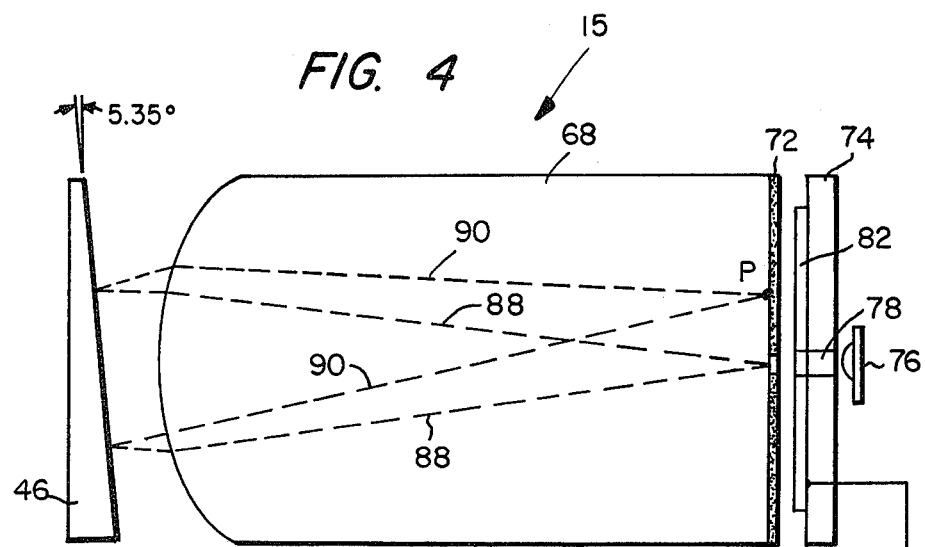
FIG. 4 is a schematic drawing of the optical sensor system of the gyroscope of FIG. 1.

The optical sensor system 15 (FIG. 1) and signal processor 104 (FIG. 1), shown in FIG. 4, provide a means for determining the values of the angular components about the X and Y axes, and hence a measure of the angular rates applied about the X and Y axes. Optical sensor 15 is attached to the right hand end plate 16 and comprises autocollimating lens 68, a fixed sunburst reticle 72, as shown in detail in FIG. 5, and plate member 74. A portion of light from a light emitting diode (LED) 76 passes through aperture 78 and is collimated by lens 68. The LED 76 produces light having a wavelength of approximately 0.9 microns, the approximate wavelength at which the silicon detector 82 has its peak response. As shown in FIG. 4, the collimated light indicated by the dotted lines 88 is reflected by the spinning mirror 46 which is tilted at an angle of approximately 5.35 degrees, focused by the lens 68 to a point P on the surface of the reticle 72. Because of the tilt of mirror 46 the light at point P traces a circle even in the absence of any angular rates about X and Y axes, as shown in FIG. 6A by dotted line 91. The light passing through the reticle 72 is amplitude modulated and such modulated light is sensed by detector 82. The detector 82 converts the modulated light signals into corresponding amplitude modulated electrical signals for processing by the signal processor after amplification by amplifier 102 as shown in FIG. 6B.

Figure 5:
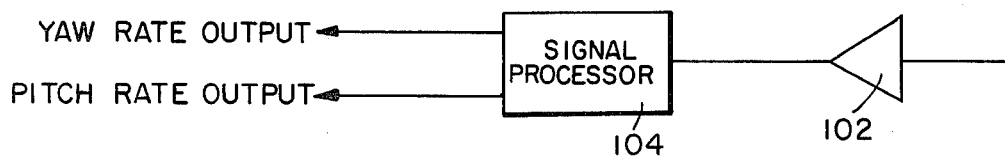
FIG. 5 is a plan view of the reticle used in the sensor system of FIG. 4.
Figure 5:
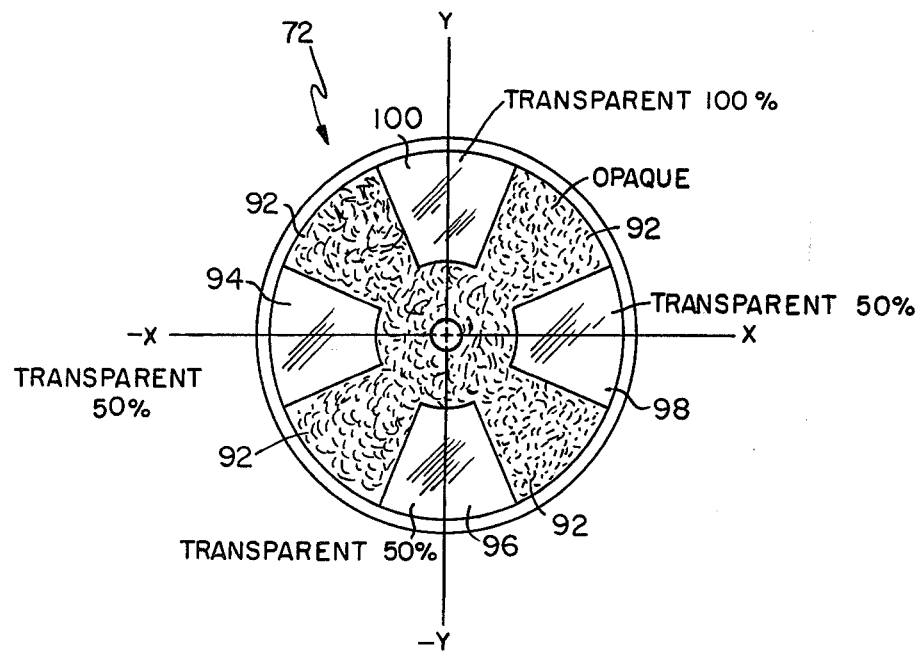

Reticle 72, as shown in FIG. 5, comprises four opaque quadrants 92, three 50% transparent quadrants 94, 96 and 98 and one 100% transparent quadrant 100. The quadrant 100 is here aligned along the Y axis as shown both in FIGS. 1 and 5. The amplitude modulated signal from the silicon diode detector 82 is amplified by amplifier 102 and fed to signal processor 104. The reticle 72 is fixed within the housing of the gyroscope with the 100% transparent quadrant 100 aligned with the +Y axis, as shown.

Referring to FIGS. 6A and 6B the operation of the processor 104 (FIG. 1) when there are zero angular rates about both the X and Y axes will be described. Under such condition the light is focused to a point P on the reticle 72 which circumscribes a circle 91 concentric with the Z axis i.e. the center of reticle 72. The X axis here designates the pitch of the gyroscope and the Y axis here indicates the yaw in the angular movement. Referring to FIG. 6B, the train of electrical pulses 106, 108, 110, 112 produced by the photodetector 82 are equal in width (i.e. time duration) indicating that the nutation circle 91 is centered about the Z axis. The focused light here travels clockwise, as indicated. Pulses 108, 110 and 112 represent the conversion of the light signals through the 50% quadrants 98, 96, and 94 sequentially into electrical pulses. The higher amplitude pulses 106 represent the passage of light through the 100% transparent quadrant 100, i.e. the quadrant 100, i.e. the quadrant aligned with the Y axis.

Now referring to FIGS. 7A and 7B the nutation circle 91' records the effect of an angular rate about the X axis of the gyroscope and a zero angular rate about the Y axis. The train of pulses 106', 108', 110' and 112' represent the resulting modulation to a beam of light passing through the reticle 72 and sensed by a detector 82. The nutation circle 91' is now offset with respect to the center of the reticle 72 (i.e. the Z axis) because the angular rate about the X axis has caused the plane of the disc 54 (FIG. 1) and hence the plane of the mass or drum 41, to rotate about the Y axis to a fixed angle, such angle being related to the angular rate about the X axis. The 106' and 110' pulses produced when the focused light passes through quadrants 100, 96, respectively have equal time durations and thereby indicates substantially no movement in the angular rate about the Y axis. Referring to reticle quadrant 98, because the mirror 46 is spinning about the Z axis at a constant rate and because the quadrants are tapered, as shown, the effect of the displacement of the nutation circle 91' is to shorten the path of the nutation circle 91' as it passes through the quadrant 98 and hence a relatively short pulse 108' is produced, as shown in FIG. 7B. Conversely, the path of light through the quadrant 94 is increased and a relatively longer pulse 112' is produced, as shown in FIG. 7B. The difference in time duration between pulses 106' and 110' provides a measure of the angular rate about the Y axis. Likewise, the difference in time duration between pulses 108' and 112' provides a measure of the angular rate about the X axis.

The electronics involved in the processing of the electrical pulses fed to processor 104 (FIG. 4) from the silicon diode detector 82 will be discussed with the attention being directed to FIG. 8 and FIGS. 9A–9H. Such processor 104 provides a pair of electrical signals, one such signal being a voltage having a magnitude proportional to the difference in time duration between pulses 106' and 110' (and hence, such voltage provides a measure of the angular rate about the Y axis) and the other electrical signal being a voltage having a magnitude proportional to the difference in time duration between pulses 108' and 112' (and hence such voltage provides a measure of the angular rate about the X axis).

Figure 8:
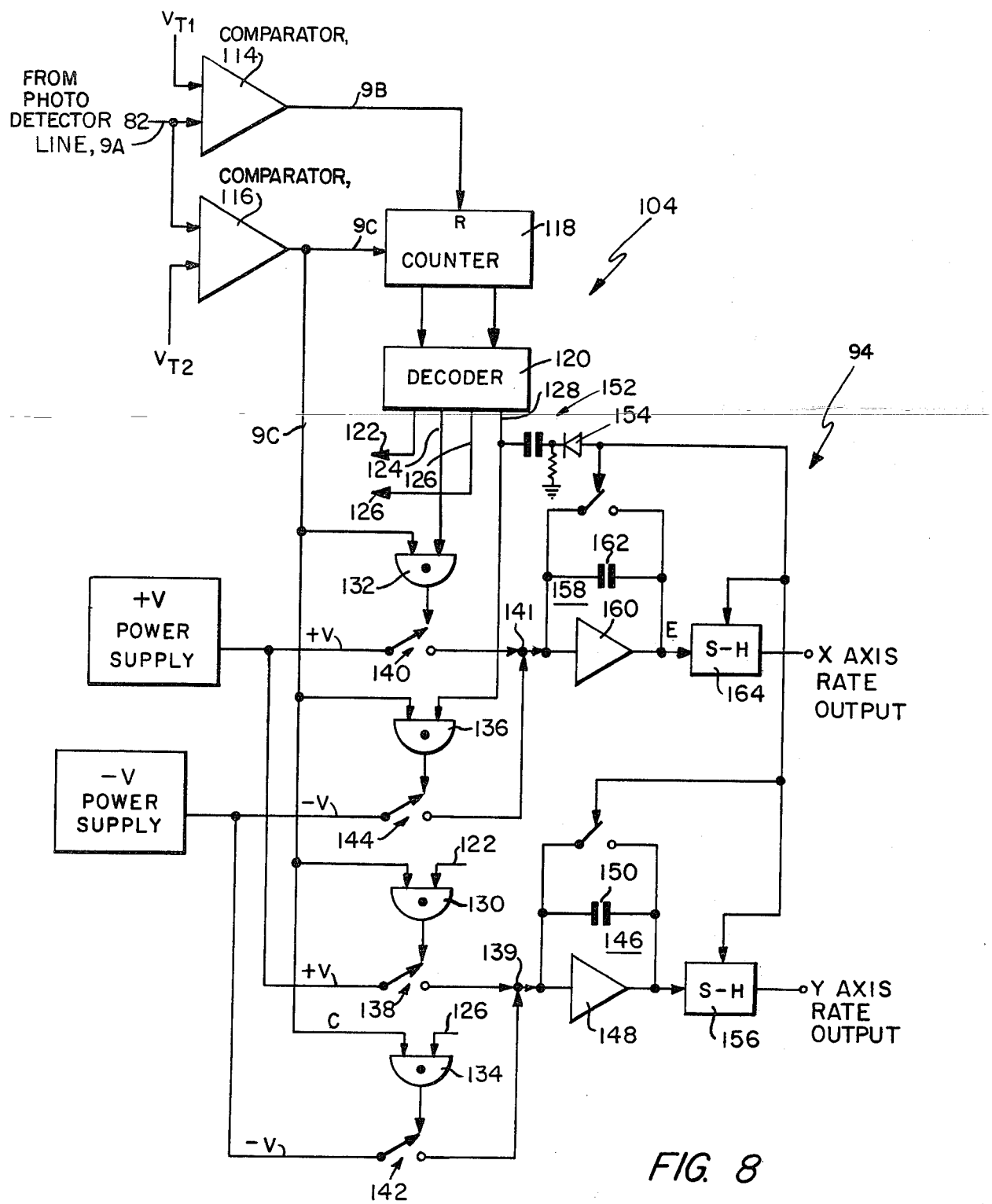
FIGS. 8 is a block diagram of the signal processor of the optical sensor system used in the gyroscope shown in FIG. 1.

Referring now to FIG. 8 the details of the processor 104 are shown. Such processor 104 includes a pair of comparators 114, 116 both of which are fed by the train of electrical pulses produced by the photo detector 82, as indicated. Comparator 114 is also fed by reference voltage source $V_{T1}$, here producing a voltage which is less than the peak of the voltage produced when the focused light passes through the 100% transparent quadrant 100 of a reticle 72 (FIG. 7A), but greater than the voltage produced when the focused light passes through any one of the 50% transparent quadrants 94, 96, 98 of reticle 72. Such voltage level $V_{T1}$ is as indicated in FIG. 9A for a train of pulses produced by the photodetector 82 under the condition when there is an angular rate about the X axis and no angular rate about the Y axis, as discussed in connection with FIGS. 7A and 7B. The comparator 116 is fed by a referenced voltage source $V_{T2}$, the level of such voltage being slightly less than the voltage produced when the focused light passes through the 50% transparent quadrants 94, 96, 98, as indicated in FIG. 9A. Comparator 114 here produces a logical 1 signal on line 9B when the level of the signal fed thereto from detector 82 is greater than $V_{T1}$ and produces a logical 0 signal, on line 9B when the voltage fed thereto from such detector 82 is less than $V_{T1}$, as shown in FIG. 9B. It follows then that each time a pulse 106'' is produced on line 9B an indication is provided that the focused light is starting to pass through 100% transparent quadrant 100, and, more particularly, provides an indication external to the housing of the gyroscope that the spinning mirror 46 (FIG. 1) is aligned substantially along the Y (or yaw) axis (FIG. 1). Further, each pulse on line 9B indicates the "start" of each cycle of the spinning mass or drum 41 and, as will be shown, the start of each processing cycle.

Comparator 116 here provides a logical one signal on line 9C when the signal fed thereto from detector 82 is greater than the referenced voltage $V_{T2}$ and produces a logical 0 signal on line 9C when the voltage fed thereto from detector 82 is less than $V_{T2}$, as shown in FIG. 9C. It follows then that a series of pulses 106'', 108'', 110'' and 112'' are produced on line 9C, each pulse having the same "logical 1" amplitude, but the time duration of each pulse is related to the orientation of the nutation circle, hence the orientation of the plane of the disc 54 and, hence, the angular rate about the X and Y axes. Here, as noted above in connection with the discussion of FIGS. 6A and 6B, when there is an angular rate about the X axis and there is no angular rate about the Y axis the time duration of the pulses 106', 110' (those produced when the focused light passes through quadrants 100, 96 (FIG. 7A)), are equal to each other but pulse 108' is shorter in time duration than pulse 112' because the time it takes for the focused light to pass through quadrant 94 is longer than the time it takes for such focused light to pass through quadrant 98 as described above in connection with FIGS. 7A and 7B. The train of pulses produced by detector 82 shown in FIG. 7B is repeated for convenience in FIG. 9A.

The signals produced on line 9B (pulses 106") (FIG. 9B) are fed to the reset terminal R of a two-bit counter 118, as shown. Also fed to such counter 118 are the signals (i.e. pulses 106", 108", 110" and 112") produced on line 9C from comparator 116. In operation the counter 118 is reset to zero by the leading edge of each pulse 106" produced on line 9B and hence starts each processing cycle. In response to pulses 108", 110", 112" the counter 118 increments sequentially through counts of $(1)_{10}$, $(2)_{10}$, and $(3)_{10}$. The output of counter 118 is fed to decoder 120. Here such decoder 120 produces a logical one signal on line 122 and logical 0 signal on lines 124, 126 and 128 when counter 118 counts 0; logical 1 signal on line 124 and logical 0 signals on lines 122, 126 and 128 when counter 118 counts $(1)_{10}$; produces a logical 1 signal on line 126 and logical 0 signal on lines 122, 124 and 128 when counter 118 counts $(2)_{10}$; and produces a logical 1 signal on line 128 and logical 0 signal on lines 122, 124 and 126 when counter 118 counts $(3)_{10}$. It follows then that logical 1 signals are produced sequencially on lines 122, 124, 126, 128 in response to pulses 106, 108, 110 and 112, as shown in FIG. 9D. The signals in lines 122, 124, 126 and 128 provide gating signals for gates 130, 132, 134 and 138, respectively, as indicated. Also fed to such gates 130, 132, 134, 136 are the signals produced on line 9C by comparator 116, as shown.

The output of gates 130, 132, 134, 136 are fed to as control or switching signals to switches 138, 140, 142 and 144, respectively, as shown. A +V power supply is fed to switches 138 and 140 and a −V power supply is fed to switches 142 and 144, as shown. Such switches 138, 140, 142, 144 are activated, (or closed) when the control signals fed to them are here logical one signals and such switches are open when the control signals fed to them are logical 0. It follows then that switches 138, 140, 142 and 144 are sequentially closed for a time duration equal to the time duration of pulses 106", 108", 110" and 112". In particular, when pulse 106" is produced gate 138 is activated and a +V voltage is coupled to the output of switch 138, such +V voltage being coupled to a terminal 139 from the output of such switch 138 for a time duration equal to the time duration of pulse 106" to produce a pulse 143, as shown in FIG. 9G. Next, switch 140 is activated and a +V voltage is coupled to a terminal 141 through the output of such switch 140 for a time duration equal to the time duration of pulse 108" to produce a pulse 145 as shown in FIG. 9E. Switch 142 is then activated and a—voltage is fed to the terminal 139 through the output of such switch 142 for a time duration equal to the time duration of pulse 110" to produce a pulse 147, as shown in FIG. 9G. Finally, completing the cycle, the −V voltage is coupled to the terminal 141 output of switch 144 for a time duration equal to the time duration of pulse 112" to produce a pulse 149 as shown in FIG. 9E.

The output of switch 138 (i.e. terminal 139) is fed to an integrator circuit 146 made up of an operational amplifier 148 having a capacitor 150 in feed-back relationship therewith, as shown. The capacitor 150 is here discharged in response to the trailing edge of the logical one signal on line 128 by the differentiating circuit 152 and diode 154 as shown. In response to the +V voltage fed to integrator 146 by switch 138 (i.e. pulse 143 FIG. 9G), the output of the integrator 146 linearly increases at a predetermined rate, as indicated by ramp 176, selected by the value of the capacitor 150 until the +V pulse ceases, as shown in FIG. 9H to reach a plateau section 178. Then, in response to the −V voltage fed to integrator 146 by switch 142 (i.e. pulse 147 FIG. 9G) the output of the integrator 146 linearly decreases at the same rate, as described by ramp 180 in FIG. 9H until the −V pulse ceases, as shown in FIG. 9H. It follows then that the voltage remaining at the output of the integrator 146 at the termination of the −V pulse is proportional to the difference in the time durations of the pulses 106' and 110' (FIG. 9A) and hence produces a measure of the angular rate about the Y axis. The output voltage is sampled and held by a conventional sampled-hold circuit 156 in response to the trailing edge of a logical one signal on line 128. Here since there is zero angular rate about the Y axis since the time duration of pulse 106' is the same as the time duration of pulse 110' and hence the sampled output of integrator 146 is here zero.

The output of switch 140 is fed (via a terminal 141) to an integrated circuit 158 made up of an operational amplifier 160 and a capacitor 162 connected as shown. The capacitor 162 is here discharged in response to the trailing edge of the logical one signal on line 128 in a manner similar to that described in connection with the discharging of capacitor 150. In response to the +V voltage fed to integrator 158 by the switch 140 through terminal 141 (pulse 145 FIG. 9E) the output of integrator 158 linearly increases as indicated by ramp 170 at a predetermined rate until such +V pulse 145 ceases, as shown FIG. 9F at 172. Then in response to the −V voltage fed to integrator 158 by switch 144 (i.e. pulse 149 FIG. 9E) the output of integrator 158 linearly decreases at the same rate as shown by ramp 174 until the −V pulse 149 ceases, as shown in FIG. 9F. It follows then that the voltage remaining at the output of the integrator 158 at the end of the −V pulse is proportional to the difference in the time durations of the pulses 108' and 112' (FIG. 9A) and hence produces a measure of the angular rate about the X axis. This output voltage is sampled and held by a conventional sample and hold circuit 164 in response to the trailing edge of the logical 1 signal on line 128. Here the sampled output is not zero since the time durations of the pulses 108' and 112' are not equal to each other because the angular rate about the X axis is here not zero. It is also noted that the polarity of the sampled voltage produced at the output of the sampled-hold circuit 164 is related to the polarity of the angular rate about the X axis. For example, here the polarity is negative since the input rate is negative where the width of the pulse 112' is greater than the width of the pulse 108'. It should be apparent that if the width of the pulse of 108' were greater than the width of the pulse 112', where a positive angular rate is impressed about the X axis the sample output of integrator 158 would be a positive voltage.

This completes the description of the two degree of freedom rate gyroscope. It is understood that various modifications and changes in the structure shown and described may be made by those skilled in the art without departing from the spirit of the invention as expressed in the accompanying claims. Therefore, all matter shown and described is to be interpreted as illustrative and not in a limiting sence.

What is claimed is:

1. A two degree of freedom rate gyroscope comprising:
   (a) a housing;
   (b) a rotatable mass disposed within said housing; said mass having a longitudinal spin axis and two input angular rate axes mutually orthogonal to said spin axis;
   (c) said rotatable mass comprising a rotor and a rotating drum;
   (d) said rotating drum being flexibly coupled to said rotor by suspension means;
   (e) said suspension means comprising diametrically extending sets of elastic arms; one set of said arms being disposed orthogonally to a second set of such arms; said elastic arms having a predetermined elasticity sufficient to restrain the precession of the mass in response to angular rates about the two input angular rate axes such that the mass achieves an angular orientation about a pair of output axes proportional to the magnitude of such angular rates.

2. A two degree of freedom rate gyroscope comprising:
   (a) a housing;
   (b) a rotatable mass disposed within said housing; said mass having a longitudinal spin axis and two input angular rate axes mutually orthogonal to said spin axis;
   (c) said rotatable mass comprising a rotor and a rotating drum;
   (d) said rotating drum being flexibly coupled to said rotor by suspension means;
   (e) said suspension means comprising a circular disc having an inner and outer diameter section; said sections being interconnected by elastic arms extending diametrically therebetween and orthogonally to each other; said elastic arms having a predetermined spring constant characteristic sufficient to restrain the precession of the mass in response to angular rates about the two input angular rate axes such that the mass achieves an angular orientation about a pair of output axes proportional to the magnitude of such angular rates.

3. A two degree of freedom rate gyroscope according to claim 2 wherein said rotating drum is formed in two sections and the outer diameter section of said disc is sandwiched between said two sections of the drum.

4. A two degree of freedom rate gyroscope according to claim 2 wherein said rotor has an end portion of reduced diameter extending axially within said rotating drum, said reduced diameter rotor portion being formed in two sections, and the inner diameter section is sandwiched between the two sections of the rotor end portion.

* * * * *